United States Patent [19]

de Fleurieu et al.

[11] Patent Number: 4,659,219
[45] Date of Patent: Apr. 21, 1987

[54] SYSTEM FOR DETECTING THE ANGULAR POSITION OF A MECHANICAL DEVICE

[75] Inventors: Bertrand M. C. de Fleurieu; Jean-Pierre L. Couderc; Jacques J. Lonnoy, all of Paris, France

[73] Assignee: Societe Anonyme de Telecommunications, Paris, France

[21] Appl. No.: 664,246

[22] Filed: Oct. 24, 1984

[30] Foreign Application Priority Data

Oct. 27, 1983 [FR] France ............... 83 17136

[51] Int. Cl.⁴ .............. G01B 11/26; G01C 1/00; G01D 5/30
[52] U.S. Cl. ............... 356/152; 250/230
[58] Field of Search ........... 356/1, 152, 373, 375, 356/400, 401; 250/230

[56] References Cited

U.S. PATENT DOCUMENTS

| | | | |
|---|---|---|---|
| 3,885,877 | 5/1975 | Horwath et al. | 356/400 |
| 4,127,781 | 11/1978 | Sato | 250/562 |
| 4,152,588 | 5/1979 | Klatt et al. | 250/230 |
| 4,395,123 | 7/1983 | Minott | 356/353 |
| 4,521,112 | 6/1985 | Kuwabara et al. | 356/373 |
| 4,568,182 | 2/1986 | Modjallal | 356/1 |

FOREIGN PATENT DOCUMENTS 1007494 of 1977 Canada .
59-94003 5/1984 Japan ................. 356/375

OTHER PUBLICATIONS

Technisches Messen, vol. 46, No. 6, Jun. 1979, pp. 249-254, Munich, DE; W. Schulz: "Optoelektronische Messverfahren mit Doppeldioden" (p. 253, para. 3.6; FIG. 8).
Soviet Instrumentation and Control Journal, No. 8, Aug. 1971, pp. 32-35, Oxford, GB; A. P. Grammatin et al.: "Measuring instrument with a light-beam pointer and a flat scale" (pp. 32-35; FIGS.).

Primary Examiner—Stephen C. Buczinski
Attorney, Agent, or Firm—Jacobs & Jacobs

[57] ABSTRACT

The invention provides a system for detecting the angular position of a mechanical device.

The invention consists in providing the image of a slit of predetermined width on a mirror firmly fixed to said mechanical device and in reflecting the image on a semi conductor receiver comprising an array of photosensitive elements and a charge coupling device, deducing therefrom the angular position of said mechanical device and correcting the reading of the measurement supplied.

6 Claims, 5 Drawing Figures

Fig. 1a.
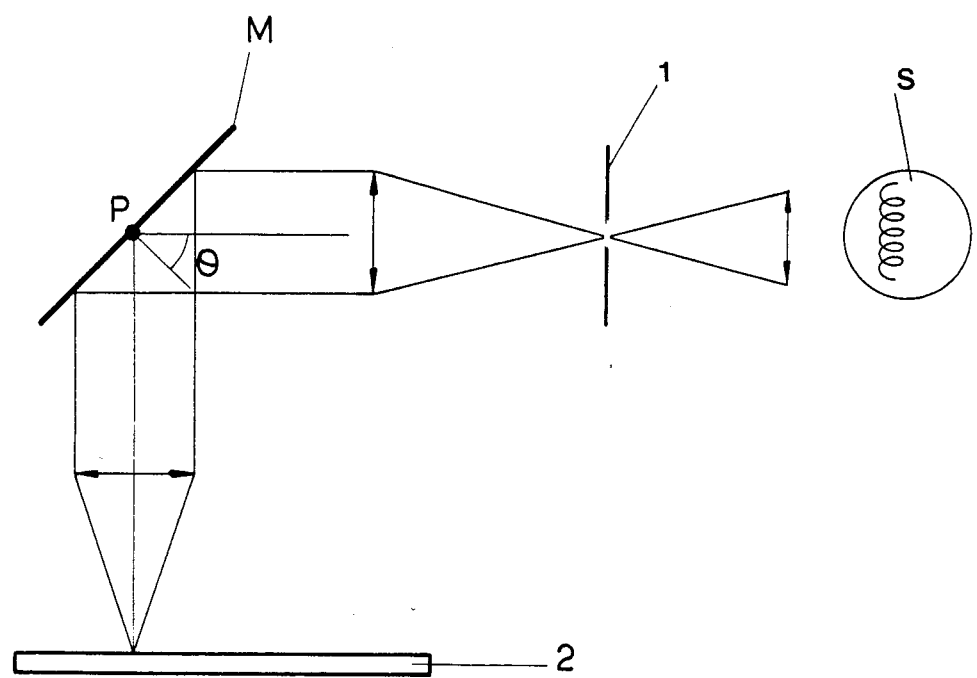
Fig. 1b.

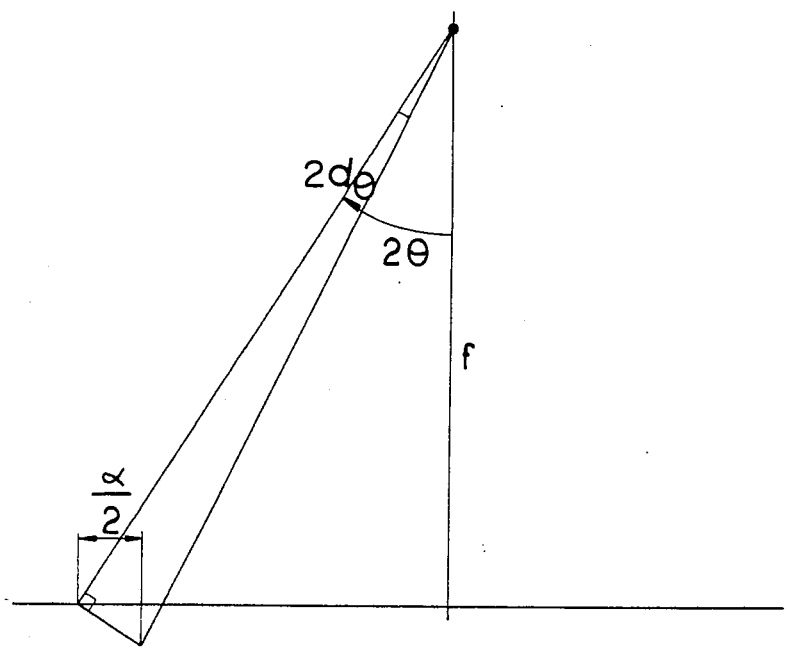
Fig_3a_
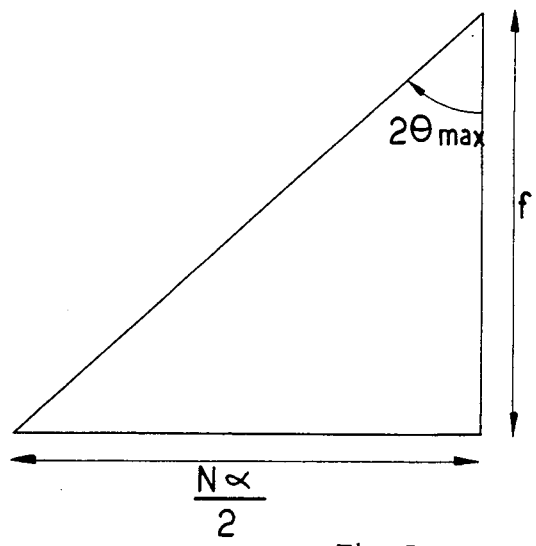
Fig_3b_

SYSTEM FOR DETECTING THE ANGULAR POSITION OF A MECHANICAL DEVICE

BACKGROUND OF THE INVENTION

The present invention relates to a system for detecting the angular position of a mechanical device comprising a mirror integral with the mechanical device, a light source and means for illuminating the mirror through a slit of predetermined width, a semi-conductor receiver comprising an array of photosensitive elements and a charge coupling device, and adapted for receiving the image of the slit reflected by the mirror and for deriving therefrom the angular position of the mechanical device.

DESCRIPTION OF RELATED ART

Systems for detecting the angular position of a mechanical device adapted to be driven with a rotational movement about an axis of rotation are already known.

For example, potentiometers, incremental coders, digital absolute coders, capacitive sensors, inductive sensors or resolvers are known. These different sensors all have the disadvantage of adding more inertia to the rotating shaft line, this inertia generally increasing considerably with the accuracy. Potentiometers are furthermore subject to wear, the friction of the slider inevitably wearing the resistive track. Capacitive sensors are limited to very small angular movements.

A system of the above mentioned type is also known more especially from patent U.S. Pat. No. 4,127,781.

However, considering the performances of the commercially available charge transfer devices, the maximum angular speed of the mirror which is admissible is insufficient in present detection techniques, so that it often happens that several (n) photosensitive elements of the array are illuminated during the integration time $\Delta t$, or the charge transfer time.

Moreover, in the shift or transfer register of charge transfer devices, the transfers always take place in the same direction, that is to say from rank N to rank N−1 and so on until rank 1 the closest to the output. Thus, the first element detected at the output of the shift register may be either the one which is illuminated at the beginning of time $\Delta t$, or the one which was illuminated at the end of this time, depending on the direction of movement of mirror M. Since the movement of the mirror is superimposed on this charge transfer, this transfer being longer or shorter depending on the position of the n illuminated elements, the measurement supplied by the semi-conductor receiver gives a result likely to be uncertain. This phase delay is all the more troublesome since it varies with the position, speed and direction of movement of the mirror.

SUMMARY OF THE INVENTION

The present invention aims at overcoming these disadvantages.

To this end, the present invention relates to a system of the above mentioned type, characterized by the fact that it comprises means for correcting the reading of the measurement supplied by the receiver, comprising means for storing two addresses I and J supplied by the receiver and corresponding to two elements of the receiver illuminated at two instants separated by an integration time $\Delta t$ determined by the receiver and a ROM (read only memory) addressable by the stored addresses I and J, said ROM having been preprogrammed for providing corrections of the appropriate parameters.

Thus, with the system of the invention, excellent accuracy and linearity may be obtained without appreciably increasing the inertia of the moving assembly. The system of the invention aims at eliminating wear.

BRIEF DESCRIPTION OF THE DRAWINGS

Other features and characteristics of the invention will be clear from the following description with reference to the accompanying drawings.

FIG. 1a is a general diagram of the detection device of the invention;

FIG. 1b is a top view of the receiver of the device of FIG. 1a;

FIG. 3a is an illustration of the angular deviation $2d\theta$ when the light beam moves over the receiver of FIG. 1b, and FIG. 3b is an illustration of the maximum angle swept by the light beam detectable by the receiver of FIG. 1b.

DETAILED DESCRIPTION OF THE PREFERRED EMBODIMENTS

Figure 2:
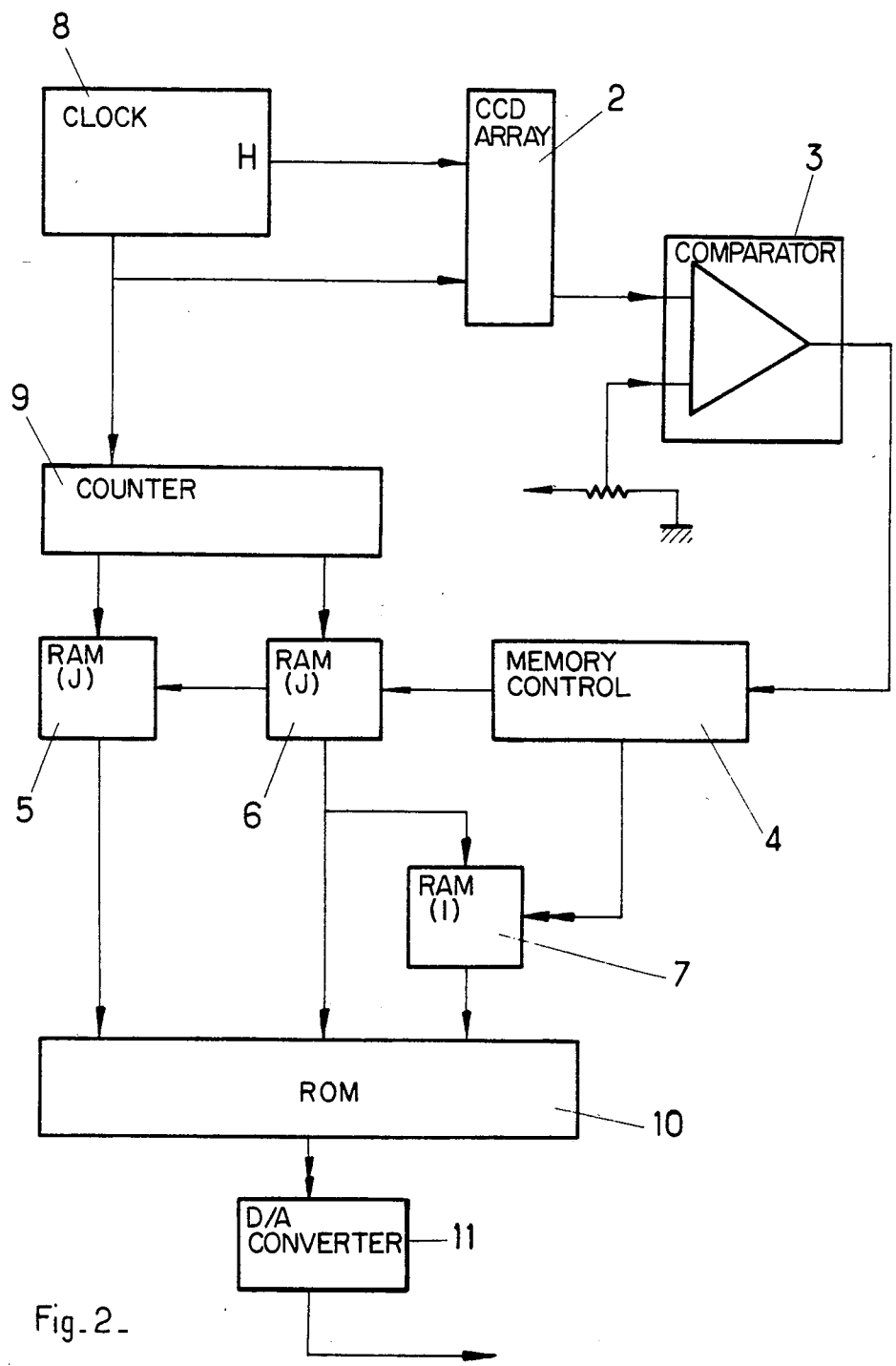
FIG. 2 is a diagram of the device for processing the data collected by the device of FIG. 1.

FIG. 1a shows the general diagram of the angular position detecting device of the invention. Let P be a mechanical device whose angular position it is desired to know. A mirror M is fixedly disposed on this device P so as to recopy its movements. Let S be a white or monochromatic light source, a slit 1 being placed in front of this light source. The mechanical part P whose angular position it is desired to detect is illuminated by placing it in the path of the light transmitted through the slit. The light reflected by the mechanical device P, or more exactly by the mirror M carried by this mechanical part P, is collected on a reception device 2. A semi conductor device formed of an array of photosensitive elements is advantageously used as reception device 2. FIG. 1b shows a top view of this photosensitive element array.

Photosensitive detectors are already known, in the art, using for example a charge coupling device (also called CCD). Such detectors are formed from a semi conductor substrate, a certain number n of detection surfaces or elements formed on the substrate, and a shift register whose size depends on the number of elements, placed in the sweep direction, said register allowing transfer of the stored charges to the output. An optical focusing system, for example lenses, is used for obtaining the image of the source slit on the photosensitive element array. Let $\alpha$ be the width of slit 1. An array is used whose photosensitive elements are spaced apart by $\alpha$ and such that the width of each element is greater than the blind zone between two elements. Since the width of slit 1 is equal to $\alpha$, a single element receives light (sometimes two adjacent cells if the image of the slit falls between the two). Thus, if the mirror, or mechanical part, is fixed, the rank of the element illuminated is characteristic of the position of the mirror within $\alpha/2$. The charges accumulated in each element in response to the light data are transferred at regular time intervals $\Delta t$ into the shift register, and then are routed in series to the output where they are converted into a voltage. Let $f_o$ be the output timing frequency for series reading of the state presented by all the elements of the semi conductor device 2 at the time of a transfer; the relationship $$\frac{N}{f_o} \leq \Delta t$$

must obviously be realized.

This will be assumed in the rest of the description.

The rank of the illuminated element may therefore be known by counting the number of shifts required for causing the voltage representative of the illuminated element to appear at the output. The linearity of such a measurement is dependent on the number N of elements forming the array 2 and on the maximum angle $\theta$max which is measured with respect to the median position. Calculation of the angular deviation $d\theta$ corresponding to a movement of the beam of $a/2$ on array 2 may be expressed, as a function of the angle $\theta$ itself, of the width $a$ of the slit and of the focal distance f of the optical reception system by the relationship:

$$\tan 2\theta_{max} = \frac{N}{2} \frac{a}{f}$$

as shown in FIG. 3b. The linearity is expressed by:

$$\frac{d\theta_{max}}{2\theta_{max}}$$

that is:

$$\frac{d\theta_{max}}{2\theta_{max}} = \frac{\tan 2\theta_{max}}{N\theta_{max}}$$

The total angular zone in which the position of a mirror may be known extends over about 90°, which corresponds to a value of $\theta_{max}$ less than 45°.

However, if the mechanical part P and so mirror M undergo angular movements, it is not as simple to establish a correlation between the position of the part, one of the detection elements and the voltage read at the output. In fact, if the frequency $f_o$ admissible by the semi-conductor reception device 2 is sufficiently high, an integration time $\Delta t = N/f_o$ may be chosen which is sufficiently short so that the beam cannot move, during this time $\Delta t$, through an angle greater than $2d\theta_{max}$, taking into account the speeds occurring in the mechanical device. In such a case, dynamic operation is as simple as static operation. The maximum angular speed admissible for the mirror is then such that:

$$v_{max} \Delta t \leq \frac{2d\theta_{max}}{2} \text{ whence } v_{max} \leq \frac{d\theta_{max}}{\Delta t} = \frac{f_o \tan 2\theta_{max}}{N^2}$$

Unfortunately, such a limitation is insufficient for present detection techniques considering the performances of commercially available charge transfer circuits and, very often, when the mirror M is moving a number n of elements is illuminated during the time $\Delta t$.

Furthermore, in the shift or transfer register of charge transfer devices, the transfers always take place in the same direction, i.e. from rank N to ring N−1 and so on as far as rank 1, the closest to the output. Thus, the first element detected at the output of the shift register may be either the one which was illuminated at the beginning of time $\Delta t$, or the one which was illuminated at the end of this time, depending on the direction of movement of morror M. Since the movement of the mirror is superimposed on this charge transfer, this transfer being longer or shorter depending on the position of the N illuminated elements, the measurement supplied by the semi-conductor receiver gives a result likely to be uncertain. This phase delay is all the more troublesome since it varies with the position, the speed and the direction of movement of the mirror.

The invention aims at overcoming such drawbacks by providing a correction system such as shown in FIG. 2.

This correction device receives the output signal from the shift register of the reception device 2 of FIG. 1. This correction device comprises a comparator 3 which receives a threshold control at one input and the output signal from the shift register at the other input and supplies at its output a signal representative of the illuminated element, in the form of a voltage. This signal from comparator 3 is applied to the input of a control circuit 4 which sends an order, on the one hand, to the input of RAMS 5 and 6 and, on the other hand, to the input of another RAM 7. The RAM 7 stores the preceding measurement I, whereas the RAMS 5 and 6 store the last incoming measurement J; measurement J is the address of the last illuminated element of array 2 and measurement I is the address of the last but one illuminated element of array 2.

A clock signal generator 8 is provided which supplies the reading signal H for the register to the input of the reception device 2 as well as the signal for advancing a counter 9 supplying light parallel bits. It is counter 9 which supplies two groups of four bits to the input of memories 5 and 6 respectively, and representing the most significant and least significant address bits, respectively.

The contents of the addresses of memories 5, 6 and 7 is applied to the input of a ROM 10. This memory 10 therefore receives twelve address bits and outputs eight data bits representative of the corrected angular position. More exactly, these eight bits are applied to a digital-to-analog converter 11 which outputs an analog copy of the signal. It will be noted that only the four least significant bits are stored in the RAM 7. In fact, during detection between a position I and a position J, the address has not undergone too great a modification so that storage of the least significant bits is sufficient, since the speeds are sufficiently low so that, knowing J and the four least significant bits of the position I, I and J are known without ambiguity.

It is then sufficient to preprogram memory 10 for making all the necessary corrections to the measurement of the detection. This ROM 10 is, for example, a memory EPROM 2 732 manufactured by the firm Intel. It is sufficient to choose the main corrections which it is desired to make to the reading of each measurement. It is a question advantageously of the correction of speed, the corrections of the distortions of the optical system for focusing the light pencil beams, and the correction of non linearity due to the tangent effect. At the end of this description will be found the preferred form of the program of memory 10 proposed by the applicant and written in FORTRAN.

As far as the speed correction is concerned, the measurement of I and J gives a suitable accuracy. In fact, let us consider a time for integration of the light which lasts from time $t_o$ to time $t_o + \Delta t$; the output voltage characteristic of an illuminated element appears at time:

$$t_o + \Delta t + \frac{J}{f_o}$$

Let $t_m$ be this measurement time corresponding to the illuminated element J. For the preceding integration period, from $t_o - \Delta t$ to $t_o$, the first illuminated element was the Ith which corresponds to the measurement time $$t_o + \frac{I}{f_o}.$$

If $\Delta t$ is sufficiently short so that the speed does not appreciably change between $t_o - \Delta t$ and $t_o + \Delta t$ from the knowledge of I and J the exact position of the mirror may be known at time $t_m$. In fact, the angular speed $V_o$ at time $t_o$ is expressed as a function of the angle of the light beam with the perpendicular of mirror M during two positions I and J by:

$$V_o = \frac{\theta(J) - \theta(I)}{\Delta t}$$

The number n of elements illuminated during time $\Delta t$ is therefore $|J - I|$. If J is less than or equal to I, the light beam moves towards the elements close to the output and J is therefore the cell illuminated at time $t_o + \Delta t$. On the other hand, if J is greater than I, J is the cell illuminated at time $t_o$ and at time $t_o + \Delta t$ it is the $J + |J - I|$ which is illuminated. In both cases, the position of the mirror at time $t_m$ of the measurement may be estimated in the following way:

$$\theta(t_m) = \theta(J) + \frac{J}{f_o} V_o \text{ if } J \leq I$$

$$\theta(t_m) = \theta(2J - I) + \frac{J}{f_o} V_o \text{ if } J > I$$

The restrictive condition concerning the speed of the mirror then gives place to a condition concerning the acceleration which is much less restrictive in practice. In fact, to keep the resolution of static operation in both cases $$\frac{J}{f_o} \Delta V$$

must be less than $d\theta_{min}$ where $\Delta V$ is the angular speed variation during the time $\Delta t$. The most unfavorable case corresponds to $J = N$ where N is the total number of detection elements or cells, namely:

$$\frac{N}{f_o} \Delta V \leq \frac{d\theta_{min}}{2}$$

The maximum angle $\theta_{max}$ detectable by the elements of the semi-conductor device 2 is such that $$\tan 2\theta_{max} = \frac{N}{2} \frac{\alpha}{f}$$

where f is the focal distance of the optical system as shown in FIG. 3b.

On the other hand, as shown in FIG. 3a, $d\theta$ is expressed as a function of the angle $\theta$ through which the mirror has rotated. When the mirror rotates by $\theta$, the reflected beam rotates by $2\theta$ so the angle $d\theta$ on the semi-conductor receiver 2 corresponding to a movement of the beam of $\alpha/2$ is expressed by:

$$d\theta = \frac{\alpha}{2} \cos 2\theta \frac{\cos 2\theta}{f} = \frac{\alpha}{2f} \cos^2 2\theta$$

In the expression $d\theta$, $\alpha/2f$ may therefore be replaced by $$\frac{\tan 2\theta_{max}}{N},$$

which gives, expressed in radians $$d\theta = \frac{\cos^2 2\theta \tan 2\theta_{max}}{N}$$

It can be seen that $d\theta$ depends on $\theta$ and is maximum for $\theta$ equal to 0. We then have:

$$d\theta_{max} = \frac{\tan 2\theta_{max}}{N}$$

$d\theta$ is minimum for $\theta = \theta_{max}$ and is expressed by:

$$d\theta_{min} = \frac{\sin 2\theta_{max} \cos 2\theta_{max}}{N}$$

The condition concerning the variation of the angular speed is deduced therefrom:

$$\Delta V \leq \frac{\sin 2\theta_{max} \cos 2\theta_{max}}{2N^2} f_o$$

A restrictive condition may therefore be deduced therefrom concerning the admissible acceleration:

$$\gamma_{max} = \frac{\Delta V}{\Delta t} \max = \frac{\Delta V}{N} \max f_o$$

Or else;

$$\gamma_{max} = \frac{\sin 2\theta_{max} \cos 2\theta_{max}}{2N^3} f_o^2$$

Such a system for detecting the angular position has been constructed. By using a semi-conductor receiver 2 comprising $N = 256$ elements, with a reading frequency $f_o = 10$ MHz and causing the mirror to oscillate through $\theta = \pm 10°$ about its median position, satisfactory results were obtained up to speeds of the order of 105 radians/s and accelerations of the order of 47000 radians/s².

The linearity obtained in static operation is expressed by:

$$\frac{d\theta_{max}}{\theta_{max}} = \frac{\tan 2\theta_{max}}{N\theta_{max}} \text{ or } \frac{d\theta_{max}}{2\theta_{max}} < 0.21\%$$

on the other hand, in dynamic operation a correction is indispensable for $$V_{max} = \frac{\tan 2\theta_{max}}{N^2} f_o \approx 28 \text{ rd/s}$$

Now, speeds of 105 rd/s may be met with. Similarly, the maximum acceleration $\gamma_{max}$ is of the order of $0.9 \times 10^6$ rd/s$^2$, which is considerably greater than 47000 rd/s$^2$ to which the mirror is subjected. The corrections made to the system of the invention have then proved indispensable and satisfactory.

In practice, with a receiver having 256 cells, the cell illuminated at each measuring cycle is detected by a 8 bit word. To apply the speed correction based on the knowledge of two consecutive measurements I and J, a 16 address bit memory would be required. Since such a memory does not yet exist, a 12 bit address memory is used while only addressing the four least significant bits of the prior word I. If the speed remains less than a certain limit calculated by the program of the memory with the knowledge of the four least significant bits of I, knowing all the bits of J, the most significant bits of I may be reconstituted with certainty, I being the number of the cell having these most significant bits and being the closest to cell J. This is one of the operations provided by the program. The speed limitation thus introduced remains much less restrictive than the one which is imposed when no speed correction is effected. When 16 address bit EPROMS exist, this limitation will disappear.

CORRECTION PROGRAM :

```
              DIMENSION XCOF(5)
              BYTE P(4096),Q(4096)
              REAL LAMBDA
200           WRITE (7,100)
100   FORMAT (/1X,' WHAT IS THE SCHEDULED TRANSFER FREQUENCY ?
      1,'IN MHZ ?:',$)
              READ (7,*,ERR=200) F0
201           WRITE (7,202)
202   FORMAT(/1X,' TO HOW MANY ELEMENTARY TRANSFERS DOES THE INTEGRA
      1,'TION TIME CORRESPOND ?',/54X,'( AT LEAST 256) :',$)
              READ (7,*,ERR=201) NT
              IF (NT.LT.256) GO TO 201
3             WRITE (7,20)                                  OPTICAL
20    FORMAT (/1X,' WHAT WILL BE THE FOCAL LENGTH OF THE RECEIVING/
      1,' SYSTEM IN mm ?:',$)
              READ (7,*,ERR=3) FF
4             WRITE (7,30)
30    FORMAT (/1X,' WHAT IS THE PITCH OF THE CELLS OF THE CCD'CIRCUI
      1,'IN MICRONS ?:',$)
              READ (7,*,ERR=4) ALPHA
5             WRITE (7,40)
40    FORMAT (/1X,' IS THERE DISTORTION IN THE OPTICAL SYSTEM ?'
      1,' (1=YES 0=NO) :',$)
              READ (7,*,ERR=5) ND
              IF (ND.EQ.0) GO TO 7
              IF (ND.NE.1) GO TO 5
6             WRITE (7,50)
50    FORMAT (/1X,' WHAT ARE THE 5 COEFFICIENTS OF THE DIS-
      1,' TORTION LAW ?:')
              DO 8 I1=1,5
8             READ (7,*,ERR=6) XCOF(I1)
7             WRITE (7,60)
60    FORMAT (/1X,' WHAT IS THE WAVE LENGTH OF THE SOURCE
      1,'IN MICRONS ?:',$)
              READ (7,*,ERR=7) LAMBDA
              DP=2.44*LAMBDA*FF/ALPHA
              WRITE (7,70) DP,ALPHA                OF
70    FORMAT (/1X,' THE MINIMUM DIAMETER/THE PUPIL IS:',F8.3
      1,' mm',/1X,' FOR A DEFRACTION SPOT OF   :',F5.1,' MICRONS')
              NMD=ND-2
              CALL DISTOR (255.,AAK,XCOF,NMD,ALPHA,AT,FF)
              ATD=AT*57.29578!              ATD=AT*180./PI
              WRITE (7,80) ATD
80    FORMAT (/1X,'THE TOTAL ANGLE MEASURED BY THE SENSOR WILL BE :'
      1,F8.3,' DEGREES')
              VMAX=7.E6*SIN(AT)*F0/COS(AT)/512./FLOAT(NT)
              WRITE (7,81) VMAX
```

```
81      FORMAT (/1X,' THE SPEED OF THE MIRROR MUST NEVER EXCEED :'
       1,G10.3,' RADIANS/SECOND ')
        GM=SIN(AT)*COS(AT)*F0*F0/FLOAT(NT)*7629394.531
        WRITE (7,90) GM
90      FORMAT (/1X,'THE MAXIMUM ACCELERATION ALLOWED IS :'
       1,G10.3,' RADIANS/ SECOND/SECONDS')
299     WRITE (7,300)
300     FORMAT (/1X,' DO YOU DESIRE TO CHANGE THE PARAMETERS ?'
       1,' (1=YES,0= NO) :',$)
        READ (7,*,ERR=299) NNC
        IF (NNC.EQ.1) GO TO 200
        IF (NNC.NE.0) GO TO 299
301     WRITE (7,302)
302     FORMAT (/1X,' DO YOU DESIRE TO CREATE THE FILE ?'
       1,' (1=YES,0= NO) :',$)
       READ (7,*,ERR=301) NFI
       IF (NFI.EQ.0) GO TO 1000
       IF (NFI.NE.1) GO TO 301
       DO 1 I1=0,15
       DO 1 I2=0,15
       DO 1 I3=0,15
       N=I1*256+I2*16+I3+1
       I0=I3
       LDK=I2-I0
       IF (LDK.GE.8) I0=I0+16
       IF (LDK.LT.-8) I0=I0-16
       I=(I1*16)+I0
       J=(I1*16)+I2
       LDK=J-I
         YJ=FLOAT(J)
         CALL DISTOR (YJ,TETA0J,XCOF,ND,ALPHA,AT,FF)
         IF (LDK.NE.0) GO TO 11
         CALL HEXA (TETA0J,P(N),Q(N))
         GO TO 1
11       YI=FLOAT(I)
         CALL DISTOR (YI,TETA0I,XCOF,ND,ALPHA,AT,FF)
         COR=YJ*(TETA0J-TETA0I)/FLOAT(NT)
         IF (LDK.GT.0) GO TO 12
         TETA=TETA0J+COR
         CALL HEXA (TETA,P(N),Q(N))
         GO TO 1
12       Y=FLOAT((2*J)-I)
         CALL DISTOR (Y,TETA0,XCOF,ND,ALPHA,AT,FF)
         TETA=TETA0+COR
         CALL HEXA (TETA,P(N),Q(N))
1        CONTINUE
         OPEN (UNIT=1,NAME='DX0:PCCD.DAT',ACCESS='DIRECT',
        1RECORDSIZE=32,TYPE='NEW')
         DO 2 I1=1,64
         I2=(64*(I1-1))+1
         I3=64*I1
         WRITE (1'I1) (P(N),Q(N),N=I2,I3)
2        CONTINUE
         CLOSE (UNIT=1)
1000     CALL EXIT
         END
         SUBROUTINE DISTOR (Y,TETA,XCOF,ND,ALPHA,AT,FF)
         DIMENSION XCOF(5)
         YA=(Y-127.5)*ALPHA*1.E-3
         IF ((ND.EQ.0).OR.(ND.EQ.-2)) GO TO 2
         Y2=YA*YA
         Y4=Y2*Y2
         Y6=Y4*Y2
```

```
              Y8=Y4*Y4
              DY=XCOF(1)+(XCOF(2)*Y2)+(XCOF(3)*Y4)+(XCOF(4)*Y6)
       1+(XCOF(5)*Y8)
              Y0=YA/(1.+DY)
              GO TO 4
       2      Y0=YA
       4      R=Y0/FF
              TETA=ATAN(R)
              IF (WD.LT.0) GO TO 3
              IF (TETA.LT.-AT) TETA=-AT
              IF (TETA.GT.AT) TETA=AT
              TETA=(TETA*127.5/AT)+127.5
       1      RETURN
       3      AT=TETA
       GO TO 1
       END
       SUBROUTINE HEXA (TETA,P,Q)
       BYTE P,Q
       IA=INT(TETA)
       IF (IA.GT.255) IA=255
       IF (IA.LT.0) IA=0
       K=0
              IP=INT((FLOAT(IA)/16.)+1.E-3)
              IQ=IA-(IP*16)
              N=IP+1
       1      GO TO (2,3,4,5,6,7,8,9,10,11,12,13,14,15,16,17),N
       2      H=48
              GO TO 18
       3      H=49
              GO TO 18
       4      H=50
              GO TO 18
       5      H=51
              GO TO 18
       6      H=52
              GO TO 18
       7      H=53
              GO TO 18
       8      H=54
              GO TO 18
       9      H=55
              GO TO 18
       10     H=56
              GO TO 18
       11     H=57
              GO TO 18
       12     H=65
              GO TO 18
       13     H=66
              GO TO 18
       14     H=67
              GO TO 18
       15     H=68
              GO TO 18
       16     H=69
              GO TO 18
       17     H=70
       18     IF (K.EQ.1) GO TO 19
              K=1
              P=H
              N=IQ+1
              GO TO 1
```

```
10      Q=H
        RETURN
        END
```

What is claimed is:

1. A system for accurately measuring the angular position of an angularly-driven object, comprising:
   (a) reflecting means on the object for joint angular movement therewith;
   (b) means for generating an incident light beam, and for directing the incident beam along a light path through an aperture having a predetermined width dimension to the reflecting means for reflection therefrom, thereby generating a reflected light beam which is movable along a scan direction during said angular movement of the reflecting means;
   (c) receiver means in the path of movement of the reflected beam, and including a linear array of photosensitive elements positioned along the scan direction, adjacent elements being spaced apart from each other by a linear distance on the order of said predetermined width dimension, said receiver means being operative for sensing the position of an illuminated element being illuminated by the reflected beam, and for measuring the angular position of the reflecting means and, in turn, of the object as a function of the sensed position of the illuminated element;
   (d) clock means for generating a succession of measurement time periods; and
   (e) means for correcting the measuring of the angular position of the object, including means for measuring the linear position of one of the elements being illuminated during one of said measurement time periods, means for measuring the linear position of another of the elements being illuminated during the next measurement time period following said one measurement time period, and means responsive to the measured linear positions of said one and said another illuminated elements for generating a correction factor to correct the measuring of the angular position of the object.

2. The system as recited in claim 1, wherein the reflecting means is a planar mirror fixedly mounted on the object and jointly turnable about a turning axis with the object.

3. The system as recited in claim 1, wherein the receiver means constitutes a charge coupled device in which an electrical charge is stored on a respectively illuminated element during a respective measurement time period, and thereupon converted to an output voltage signal whose magnitude is a function of the linear position of the illuminated element.

4. The system as recited in claim 3, wherein the correcting means includes first and second storage means for separately storing the measured linear positions of said one and said another illuminated elememts; and further comprising control means responsive to the output voltage signal for controlling into which storage means the measured linear positions of said one and said another illuminated elements are stored.

5. The system as recited in claim 1, wherein the correction factor generating means includes a memory pre-programmed to account for measurement errors caused by the position, speed, acceleration and direction of movement of the reflecting means.

6. A method of accurately measuring the angular position of an angularly-driven object, comprising the steps of:
   (a) providing a reflecting means on the object for joint angular movement therewith;
   (b) generating an incident light beam, and directing the incident beam along a light path through an aperture having a predetermined width dimension to the reflecting means for reflection therefrom, thereby generating a reflected light beam which is movable along a scan direction during said angular movement of the reflecting means;
   (c) locating a receiver means in the path of movement of the reflected beam, said receiver means including a linear array of photosensitive elements positioned along the scan direction, adjacent elements being spaced apart from each other by a linear distance on the order of said predetermined width dimension, said receiver means being operative for sensing the position of an illuminated element being illuminated by the reflected beam, and for measuring the angular position of the reflecting means and, in turn, of the object as a function of the sensed position of the illuminated element;
   (g) generating a succession of measurement time periods; and
   (e) correcting the measuring of the angular position of the object, including measuring the linear position of one of the elements being illuminated during one of said measurement time periods, measuring the linear position of another of the elements being illuminated during the next measurement time period following said one measurement time period, and generating in response to the measured linear positions of said one and said another illuminated elements a correction factor to correct the measuring of the angular position of the object.

* * * * *